(12) United States Patent
Jing

(10) Patent No.: US 6,451,925 B2
(45) Date of Patent: Sep. 17, 2002

(54) COMPOSITIONS FOR FLUOROPOLYMER BONDING TO NON-FLUORINATED POLYMERS

(75) Inventor: Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/904,927

(22) Filed: Jul. 13, 2001

Related U.S. Application Data

(63) Continuation of application No. 09/260,813, filed on Mar. 2, 1999.

(51) Int. Cl.[7] .......................... C08C 19/24; C08F 8/40; B32B 31/00; C09J 5/00
(52) U.S. Cl. .................. 525/340; 156/243; 156/281; 156/306.3; 427/412.4; 427/385.5; 427/372.2; 428/36.6; 428/421; 428/422; 428/520; 428/522; 524/252; 523/200; 523/218; 523/219
(58) Field of Search ................. 156/243, 281, 156/306.3; 427/412.4, 385.5, 372.2; 428/36.6, 421, 422, 520, 522; 524/252; 525/340; 523/200, 218, 219

(56) References Cited

U.S. PATENT DOCUMENTS

| | | |
|---|---|---|
| 3,190,178 A | 6/1965 | McKenzie |
| 3,551,025 A | 12/1970 | Bingham et al. |
| 4,233,421 A | 11/1980 | Worm |
| 4,335,238 A | 6/1982 | Moore et al. |
| 4,348,312 A | 9/1982 | Tung |
| 4,558,142 A | 12/1985 | Holland et al. |
| 4,912,171 A | 3/1990 | Grootaert et al. |
| 4,933,090 A | 6/1990 | Gill et al. |
| 5,047,287 A | 9/1991 | Horiuchi et al. |
| 5,086,123 A | 2/1992 | Guenthner et al. |
| 5,262,490 A | 11/1993 | Kolb et al. |
| 5,512,225 A | 4/1996 | Fukushi |
| 5,591,804 A | 1/1997 | Coggio et al. |
| 5,656,121 A | 8/1997 | Fukushi |
| 5,658,670 A | 8/1997 | Fukushi et al. |
| 5,733,981 A | 3/1998 | Coggio et al. |
| 5,827,587 A | 10/1998 | Fukushi |
| 5,855,977 A | 1/1999 | Fukushi et al. |
| 6,156,400 A | * 12/2000 | Jing et al. |

FOREIGN PATENT DOCUMENTS

| | | |
|---|---|---|
| EP | 0 523 644 A1 | 1/1993 |
| WO | WO 93/14933 | 8/1993 |
| WO | 95/11464 | 4/1995 |
| WO | 95/11466 | 4/1995 |
| WO | 95/11943 | 5/1995 |
| WO | WO 96/05965 | 2/1996 |
| WO | WO 97/05196 | 2/1997 |
| WO | WO 99/00455 | 1/1999 |
| WO | WO 99/00460 | 1/1999 |
| WO | WO 99/52974 | 10/1999 |
| WO | WO 99/52975 | 10/1999 |

OTHER PUBLICATIONS

F.W. Billmeyer, *Textbook of Polymer Science*, 3rd ed., pp. 398–403, John Wiley & Sons, New York (1984).
Brullo, R.A., "Fluoroelastomer rubber for automotive," *Automotive Elastomer & Design*, Jun. 1985.
"Fluoroelastomers Seal Up Automotive Future," *Materials Engineering*, Oct. 1988.
"Fluorinated Elastomers," Kirk–Othmer, *Encyclopedia of Chemical Technology*, 3rd ed., vol. 8, pp. 500–515, John Wiley & Sons, New York (1979).
"Organic Fluorine Compounds," Kirk–Othmer, *Encyclopedia of Chemical Technology*, vol. 11, pp. 20, 21, 32, 33, 40, 41, 48, 50, 52, 62, 70 and 71, John Wiley & Sons, New York (1980).
"Catalysis, Phase–Transfer," Kirk–Othmer, *Encyclopedia of Chemical Technology*, vol. 5, Fourth Edition, pp. 374–381, John Wiley & Sons, New York (1993).

\* cited by examiner

Primary Examiner—Patrick D. Niland
(74) Attorney, Agent, or Firm—Scott A. Bardell

(57) ABSTRACT

The invention relates to compositions useful for bonding fluoropolymer to substantially non-fluorinated polymer. The compositions of the invention comprise a substantially non-fluorinated polymer or a mixture of said polymers, a di- or polyamine, preferably, an aliphatic diamine, and an onium catalyst, preferably, a phosphonium salt.

22 Claims, No Drawings

COMPOSITIONS FOR FLUOROPOLYMER BONDING TO NON-FLUORINATED POLYMERS

CROSS REFERENCE TO RELATED APPLICATION

This application is a continuation of U.S. application Ser. No. 09/260,813, filed Mar. 2, 1999, now pending.

BACKGROUND OF THE INVENTION

This invention relates to compositions for bonding fluoropolymers to non-fluorinated polymers, multilayer adhesive articles comprising a fluoropolymer and a substantially non-fluorinated material, and methods of making such articles.

Fluorine-containing polymers (that is, fluoropolymers or fluorinated polymers), are an important class of polymers that include, for example, fluoroelastomers and fluoroplastics. Among this broad polymer class are polymers of high thermal stability, polymers of extreme toughness, and polymers exhibiting usefulness along a broad spectrum of temperatures. Many of these polymers also are almost totally insoluble in a wide variety of organic solvents; see, for example, F. W. Billmeyer, *Textbook of Polymer Science*, 3rd ed., pp. 398–403, John Wiley & Sons, New York (1984).

Fluoroelastomers, particularly the copolymers of vinylidene fluoride with other ethylenically unsaturated halogenated monomers such as hexafluoropropylene find particular utility in high temperature applications, such as in seal gaskets and linings. See, for example, Brullo, R. A., "Fluoroelastomer Rubber for Automotive Applications," *Automotive Elastomer & Design,* June 1985; "Fluoroelastomers Seal Up Automotive Future," *Materials Engineering,* October 1988; and "Fluorinated Elastomers," Kirk-Othmer, *Encyclopedia of Chemical Technology,* 3rd ed., Vol. 8, pp. 500–515, John Wiley & Sons, New York (1979).

Fluoroplastics, particularly polychlorotrifluoroethylene, polytetrafluoroethylene, copolymers of tetrafluoroethylene and hexafluoropropylene, and poly(vinylidene fluoride), have numerous electrical, mechanical, and chemical applications. Fluoroplastics are useful, for example, as wire coatings, electrical components, seals, and in solid and lined pipes and piezoelectric detectors. See, for example, "Organic Fluorine Compounds," Kirk-Othmer, *Encyclopedia of Chemical Technology,* Vol. 11, pp. 20, 21, 32, 33, 40, 41, 48, 50, 52, 62, 70, and 71, John Wiley & Sons, New York (1980).

Multi-layer constructions containing a fluorinated polymer enjoy wide industrial application. Multi-layer fluoropolymer constructions find utility in, for example, fuel line hoses and related containers and in retroreflective sheeting materials. Increased concerns with evaporative fuel standards give rise to a need for fuel system components that have increased barrier properties to minimize the permeation of fuel vapors through automotive components including fuel filler lines, fuel supply lines, fuel tanks, and other components of the engine's fuel system control system. Various types of constructions have been proposed to address these concerns. In general, the most successful of these are co-extruded multi-layer constructions.

Multi-layer compositions comprising a fluorinated polymer layer and a polyamide or polyolefin layer are known. U.S. Pat. No. 4,933,090 (Krevor), for example, discloses laminate tubular articles that can comprise layers of fluorocarbon elastomers, and PCT Publication WO 93/14933 discloses a laminar film structure comprising a polyimide and a fluoropolymer. The use of fluorinated polymers in retroreflective sheeting also is known. U.S. Pat. Nos. 3,551,025 (Bingham et al.) and 4,348,312 (Tung), for example, describe products that include glass microspheres, and PCT Publications WO 95/11466 and WO 95/11464 describe products containing retroreflective cube corner arrays.

A variety of methods can be used to increase the adhesion between a fluorinated polymer layer and a polyamide or polyolefin layer. An adhesive layer can, for example, be added between the two polymer layers. U.S. Pat. No. 5,047,287 (Horiuchi et al.) discloses a diaphragm, suitable for use in automotive applications, that comprises a base fabric having bonded to at least one surface a fluororubber layer by an adhesive that includes an acrylonitrile-butadiene or acrylonitrile-isoprene rubber having an amino group.

Surface treatment of one or both of the layers sometimes is employed to aid bonding. Some, for example, have taught treating fluoropolymer layers with charged gaseous atmosphere and applying subsequently a layer of a second material, for example a thermoplastic polyamide.

Blends of the fluoropolymer and the dissimilar layer themselves are in some cases employed as an intermediate layer to help bond the two layers together. European Patent Application No. 0523644 (Kawashima et al.) discloses a plastic laminate having a polyamide resin surface layer and a fluororesin surface layer. The reference recognizes the difficulties encountered when making laminates having a polyamide layer and a fluororesin layer because of the incompatibility of the two materials. The laminate of the reference is prepared by use of an intermediate layer composed of a blend of an aliphatic polyamide resin with a fluorine-containing graft copolymer.

SUMMARY OF THE INVENTION

In one aspect, the invention provides a composition comprising a mixture of melt processable substantially non-fluorinated polymer, primary or secondary di- or polyamine, and onium catalyst.

In another aspect, the invention provides an article comprising a first layer comprising fluoropolymer, and a second layer bonded to the first layer comprising a mixture of: melt processable substantially non-fluorinated polymer, primary or secondary di- or polyamine, and onium catalyst. In another aspect, the invention provides a method of bonding fluoropolymer to substantially non-fluorinated polymer comprising the steps of: providing a bonding composition comprising a mixture of melt processable substantially non-fluorinated polymer, primary or secondary di- or polyamine, and onium catalyst; providing fluoropolymer; and forming a multi-layer article by contacting a first layer comprising the substantially non-fluorinated polymer with a second layer comprising the fluoropolymer.

Some of the advantages of the articles of the invention include lower cost, chemical resistance, and resistance to marking or dirt and grime, for example for signage. The compositions of the invention provide improved adhesion to fluoropolymers while using smaller quantities of polyamines than compositions not containing an onium catalyst.

DETAILED DESCRIPTION OF THE INVENTION

Fluoropolymer materials useful in the present invention include those fluoropolymers broadly categorized structurally into three basic classes. A first class includes those fluorinated polymers, copolymers, terpolymers, etc., comprising interpolymerized units derived from vinylidene fluoride or vinyl fluoride (sometimes referred to as "VF$_2$" or "VDF" and VF respectively). Preferably fluoropolymer materials of this first class comprise at least 3 percent by weight of interpolymerized units derived from VF$_2$ or VF. Such polymers may be homopolymers of VF$_2$ or VF or copolymers of VF$_2$ or VF and other ethylenically unsaturated monomers. Copolymers of VF$_2$ or VF and other ethylenically unsaturated monomers are examples of fluoropolymers.

VF$_2$ and VF-containing polymers and copolymers can be made by well-known conventional means, for example, by free-radical polymerization of VF$_2$ with or without other ethylenically-unsaturated monomers. The preparation of colloidal aqueous dispersions of such polymers and copolymers is described, for example, in U.S. Pat. No. 4,335,238 (Moore et al.). It follows the customary process for copolymerizing fluorinated olefins in colloidal aqueous dispersions, which is carried out in the presence of water-soluble initiators that produce free radicals, such as, for example, ammonium or alkali metal persulfates or alkali metal permanganates, and in the presence of emulsifiers, such as, in particular, the ammonium or alkali metal salts of perfluorooctanoic acid.

Useful fluorine-containing monomers for copolymerization with VF$_2$ or VF include hexafluoropropylene ("HFP"), tetrafluoroethylene ("TFE"), chlorotrifluoroethylene ("CTFE"), 2-chloropentafluoro-propene, perfluoroalkyl vinyl ethers, for example, $CF_3OCF=CF_2$ or $CF_3CF_2OCF=CF_2$, 1-hydropentafluoropropene, 2-hydropentafluoropropene, dichlorodifluoroethylene, trifluoroethylene, 1,1-dichlorofluoroethylene, vinyl fluoride, and perfluoro-1,3-dioxoles such as those described in U.S. Pat. No. 4,558,142 (Squire). Certain fluorine-containing di-olefins also are useful, such as perfluorodiallylether and perfluoro-1,3-butadiene. Said fluorine-containing monomer or monomers also may be copolymerized with fluorine-free terminally unsaturated olefinic co-monomers, for example, ethylene or propylene. Preferably at least 50 percent by weight of all monomers in a polymerizable mixture are fluorine-containing. Said fluorine-containing monomer may also be copolymerized with iodine- or bromine-containing cure-site monomers in order to prepare peroxide curable polymer. Suitable cure-site monomers include terminally unsaturated monoolefins of 2 to 4 carbon atoms such as bromodifluoroethylene, bromotrifluoroethylene, iodotrifluoroethylene, and 4-bromo-3,3,4,4-tetrafluorobutene-1.

Commercially available fluoropolymer materials of this first class include, for example, THV 200 fluoropolymer (available from Dyneon LLC of Saint Paul, Minn.), THV 500 fluoropolymer (available from Dyneon LLC), KYNAR™ 740 fluoropolymer (available from Elf Atochem North America, Inc., Glen Rock, N.J.), and FLUOREL™ FC-2178 fluoropolymer (available from Dyneon LLC).

A second class of fluorinated material useful in the practice of the invention broadly comprises those fluorinated polymers, copolymers, terpolymers, etc., comprising interpolymerized units derived from one or more of hexafluoropropylene ("HFP") monomers, tetrafluoroethylene ("TFE") monomers, chlorotrifluoroethylene monomers, and/or other perhalogenated monomers and further derived from one or more hydrogen-containing and/or non-fluorinated olefinically unsaturated monomers. Useful olefinically unsaturated monomers include alkylene monomers such as ethylene, propylene, 1-hydropentafluoropropene, 2-hydropentafluoropropene, etc.

Fluoropolymers of this second class can be prepared by methods known in the fluoropolymer art. Such methods include, for example, free-radical polymerization of hexafluoropropylene and/or tetrafluoroethylene monomers with non-fluorinated ethylenically-unsaturated monomers. In general, the desired olefinic monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See, for example, U.S. Pat. No. 4,335,238 (Moore et al.).

Representative of the fluoropolymer materials of the second class are poly(ethylene-co-tetrafluoroethylene) (ETFE), poly(tetrafluoroethylene-co-propylene), poly(chlorotrifluoroethylene-co-ethylene) (ECTFE), and the terpolymer poly(ethylene-co-tetrafluoroethylene-co-hexafluoropropylene), among others; all of which may be prepared by the above-described known polymerization methods. Many useful fluoropolymer materials also are available commercially, for example from Dyneon LLC, under the trade designations HOSTAFLON™ X6810, and X6820; from Daikin America, Inc., Decatur, Ala., under the trade designations NEOFLON™ EP-541, EP-521, and EP-610; from Asahi Glass Co., Charlotte, N.C., under the trade designations AFLON™ COP C55A, C55AX, C88A; and from E. I. Du Pont de Nemours and Company, Wilmington, Del., under the trade designations TEFZEL™ 230 and 290.

A third class of fluorinated materials useful in the practice of the invention broadly comprises blends of fluoropolymers and polyolefins. Specific examples include blends of PVDF and poly(methyl methacrylate) (PMMA) and blends of PVDF and high vinyl acetate functionalized polyolefins.

Useful substantially non-fluorinated polymeric materials can comprise any of a number of well known, substantially non-fluorinated, hydrocarbon-based polymers, and mixtures thereof. These polymeric materials also include such substantially non-fluorinated polymeric materials considered to be pressure sensitive adhesives. As used herein, the term "substantially non-fluorinated" refers to polymers and polymeric materials having fewer than 10 percent of their carbon-bonded hydrogen atoms replaced with fluorine atoms. Preferably, the substantially non-fluorinated polymer has fewer than 2 percent of its carbon-bonded hydrogen atoms replaced with fluorine atoms, and more preferably fewer than 1 percent of its carbon-bonded hydrogen atoms are replaced with fluorine atoms. Preferred substantially non-fluorinated polymers include thermoplastic polyamides, polyurethanes, polyolefins, and copolymers of polyolefins.

Any melt-processable, carboxyl, carboxylate, anhydride, amide, imide, hydroxyl, or oxycarbonyl functional polyolefin may be used to make the substantially non-fluorinated polymeric material of the invention. Polyolefins, e.g., polymers of ethylene, propylene, acrylic monomers, other higher α-olefins, or other ethylenically unsaturated monomers, may be functionalized by homopolymerization of functional olefin monomers or by co-polymerization of non-functional olefin monomers with functional monomers, for example, with acrylic acid or maleic anhydride, vinyl acetate, etc. Polyolefins may also be modified, or functionalized, after polymerization, for example by grafting, by oxidation or by forming ionomers. Such polymers and copolymers can be prepared by conventional free-radical polymerization or catalysis of such ethylenically unsaturated monomers. The degree of crystallinity of the hydrocarbon polymer or copolymer can vary; the polymer may, for example, be a semi-crystalline high density polyethylene or may be an elastomeric copolymer of ethylene and propylene. Representative of such substantially non-fluorinated polymer useful in the present invention include, but are not limited to, co- and terpolymers of the above-listed functional monomers with, for example, propylene, ethylene, vinyl acetate, etc. The carboxyl, anhydride, or imide functional polymers useful as the hydrocarbon polymer generally are commercially available. Anhydride modified polyethylenes, for example, are available commercially from the E. I. Du Pont de Nemours and Company, under the trade designation "BYNEL," and useful oxycarboxy functional polyethylenes are available under the tradename "ELVAX" also available from E. I. Du Pont de Nemours and Company.

Blends of one or more of the carboxyl, carboxylate, anhydride, amide, imide, hydroxyl, or oxycarbonyl functional polyolefins may be blended together or with other suitable polymers to find utility in forming the substantially non-fluorinated layer or layers of the invention.

Polyamides useful as the substantially non-fluorinated polymer are generally commercially available. For example, polyamides such as any of the well-known Nylons are available from a number of sources. Particularly preferred polyamides are nylon 6, nylon 6,6, nylon 11, or nylon 12. It should be noted that the selection of a particular polyamide material should be based upon the physical requirements of the particular application for the resulting article. For example, nylon 6 and nylon 6,6 offer higher heat resistant properties than nylon 11 or nylon 12; whereas nylon 11 and nylon 12 offer better chemical resistant properties. In addition to those polyamide materials, other nylon material such as nylon 6,12, nylon 6,9, nylon 4, nylon 4,2, nylon 4,6, nylon 7, and nylon 8 may also be used. Ring containing polyamides, for example, nylon 6,T and nylon 6,I, may also be used. Polyether containing polyamides, such as PEBAX™ polyamines, may also be used.

Polyurethane polymers useful as the substantially non-fluorinated polymer include aliphatic, cycloaliphatic, aromatic, and polycyclic polyurethanes. These polyurethanes are typically produced by reaction of a polyfunctional isocyanate with a polyol according to well known reaction mechanisms. Useful diiisocyanates for employment in the production of a polyurethane include dicyclohexylmethane-4,4'-diisocyanate, isophorone diisocyanate, 1,6-hexamethylene diisocyanate, cyclohexyl diisocyanate, diphenylmethane diisocyanate. Combinations of one or more polyfunctional isocyanates may also be used. Useful polyols include polypentyleneadipate glycol, polytetramethylene ether glycol, polyethylene glycol, polycaprolactone diol, poly-1,2-butylene oxide glycol, and combinations thereof. Chain extenders, such as butanediol or hexanediol, may also optionally be used in the reaction. Commercially available urethane polymers useful in the present invention include: PN-04 or 3429 from Morton International, Inc., Seabrook, N.H., and X-4107 from B. F. Goodrich Company, Cleveland, Ohio.

The term "di-, or polyamine," as used within this description refers to organic compounds containing at least two non-tertiary amine groups. Any primary or secondary amine may be employed, although primary amines are preferred to secondary amines. Aliphatic, aromatic, cycloaliphatic, and oligomeric di- and polyamines all are considered useful in the practice of the invention. Representative of the classes of useful di- or polyamines are 4,4'-methylene dianiline, 3,9-bis-(3-aminopropyl)-2,4,8,10-tetroxaspiro [5,5]undecane, and polyoxyethylenediamine. Many di- and polyamines, such as those just named, are available commercially, for example, under the trade designation "JEFFAMINES" (available from Texaco Chemical Company, Houston, Tex.). The most preferred di- or polyamines include aliphatic diamines or aliphatic di- or polyamines and more specifically two primary amino groups, such as hexamethylene diamine, dodecanediamine, and 2,4,8,10-tetraoxaspiro[5,5] undecane-(3,9-dipropanamine).

The di- or polyamine can be of any molecular weight that when used in accordance with the present description will impart adhesive bond strength between a fluoropolymer and a substantially non-fluorinated polymeric material. As an example, the di- or polyamine may have a weight average molecular weight of below 5,000, more preferably below 2,000, or 1,000, as measured by mass spectroscopy or gel permeation chromatography (GPC).

Generally, the amount of diamine used in the compositions of the invention range from about 0.3 to about 10 parts by weight.

The compositions of the invention include an organo-onium catalyst. Any among a large class of organo-onium compounds that are stable in the compositions of the invention are useful for incorporation into the substantially non-fluorinated polymeric material. As is known in the art, an organo-onium is the conjugate acid of a Lewis base (for example phosphine, amine, and a sulfide) and can be formed by reacting said Lewis base with a suitable alkylating agent (for example, an alkyl halide or acyl halide) resulting in an expansion of the valence of the electron donating atom of the Lewis base and a positive charge on the organo-onium compound. Many of the organo-onium compounds useful in the present invention contain at least one heteroatom, that is, a non-carbon atom such as N, P, O, bonded to organic or inorganic moieties. One class of quaternary organo-onium compounds particularly useful in the present invention broadly comprises relatively positive and relatively negative ions wherein a phosphorus, arsenic, antimony, or nitrogen generally comprises the central atom of the positive ion, and the negative ion may be an organic or inorganic anion (for example, halide, sulfate, acetate, phosphate, phosphonate, hydroxide, alkoxide, phenoxide, bisphenoxide, etc.). Phosphoniums are the most preferred organo-oniums for use in the present invention.

Many of the useful organo-onium compounds are described and known in the art. See, for example, U.S. Pat. Nos. 4,233,421 (Worm); 4,912,171 (Grootaert et al.); 5,086,123 (Guenthner et al.); and 5,262,490 (Kolb et al.), all of whose descriptions are herein incorporated by reference. Fluorinated oniums, such as those described in U.S. Pat. No. 5,591,804 (Coggio et al.), and multifunctional oniums, such as those comprising two or more onium groups in the same molecule (for example, bisphosphoniums) may also be employed. Representative examples include the following individually listed compounds and mixtures thereof:

triphenylbenzyl phosphonium chloride
tributylallyl phosphonium chloride
tributylbenzyl ammonium chloride
tetraethyl phosphonium bromide
tetrabutyl phosphonium bromide
methoxypropyl tributyl phosphonium chloride
tetrabutyl ammonium bromide
8-benzyl-1,8-diazabicyclo [5,4,0]-7-undecenium chloride
benzyl tris(dimethylamino) phosphonium chloride
benzyl(diethylamino)diphenylphosphonium chloride Phosphonium catalysts are preferred. Generally, the organo-onium catalyst is present in the compositions of the invention in the amount of about 0.3 to about 5 parts by weight.

In addition to the melt-processable aliphatic di- or polyamine and organo-onium catalyst, the compositions of the present invention having a first layer comprising a fluoropolymer and a second layer comprising a hydrocarbon polymer may contain one or more tackifiers to improve inter-layer adhesion. Although suitable tackifiers vary greatly in chemical structure, the most useful tackifier compounds generally will have a softening point between approximately 90° C. and 150° C. Preferably, tackifiers used in accordance with this invention are combined along with a suitable di- or polyamine and incorporated into the hydrocarbon polymer-containing layer to comprise between 1 and 50 weight percent of the hydrocarbon layer.

Tackifiers useful for this purpose include any of the tackifier compounds known to improve adhesion performance characteristics of elastomer-based adhesives. Such compounds include, for example, the following: rosins, including gum rosins, tall oil rosins, wood rosins, polymerized rosins, hydrogenated rosins, and disproportionated rosins; rosin esters, including pentaerythritol-wood rosins, pentaerythritol-stabilized rosins, and glycerine-hydrogenated wood rosins; hydrocarbon resins, including aliphatic and cycloaliphatic resins, aromatic resins, petroleum resins, and dicyclopentadiene; terpenes, including alpha-pinene, beta-pinene, d-limonene, and polyterpenes; and pure monomer resins, including styrene resins, styrene/AMS resins, and AMS/vinyl toluene resins.

Commercially available tackifiers useful in this invention include Arkon™ P-125 tackifier, a hydrogenated C9 aromatic hydrocarbon, and Super Ester™ W-125 modified rosin ester tackifier, both available from Arakawa Chemical USA, Inc., Chicago, Ill.; and Piccolyte™ S115 terpene resin tackifier, available from Hercules, Inc., Wilmington, Del.

The mixing of the di- or polyamine and the organo-onium catalyst may be by conventional means. For example, the di or polyamine and the organo-onium catalyst can be melt-processed with the second layer material, for example nylon. In some cases the di or polyamine may react with the second layer material such that the second layer material becomes modified. For example, a diamine such as 1,12 dodecyl diamine (DDDA) may be blended into a polyamide such as nylon 12, resulting in a modified nylon. The modified nylon and a vinylidene fluoride monomer unit-containing fluoropolymer could then be coextruded to form a multi-layer article, such as a film or a tube.

The heat and pressure of the method by which the layers are brought together, for example normal coextrusion processes, may be adequate to provide sufficient adhesion. However, it may be desirable to further treat the resulting multi-layer composition, for example, with additional heat or pressure or both. One way of supplying extra heat when the multi-layer composition is prepared by extrusion is by delaying the cooling of the composition because the composite is hot as a result of the coextrusion process. Where additional heating or pressure is desired, it may be accomplished by performing the steps of applying or coextruding at a temperature higher than necessary for merely processing the several components. Alternatively, the finished article may be held at an elevated temperature for an extended period of time, or the finished article may be placed in a separate means for elevating the temperature of the article, such as an oven or heated liquid bath. A combination of these methods may also be used.

The methods of this invention provide multi-layer compositions with improved inter-layer adhesion. The methods and compositions of this invention are particularly useful for making articles, such as tubing and hoses, suitable for use in motor vehicles, for example as fuel-line hoses, and for films and blow-molded articles such as bottles and anti-graffiti films where chemical resistance or barrier properties are important. The two-layer compositions of this invention are also useful in preparing compositions having three or more layers. For example, a three layer composition of fluoropolymer to anhydride modified polyolefin to unmodified polyolefin could be prepared and might be useful in a fuel-tank construction.

Transparent embodiments of multi-layer compositions of the present invention may find particular utility in the construction of retroreflective sheeting articles generally, and particularly when resistance to chemical agents, solvents, soils, reduced moisture vapor transmission or good interlayer adhesion in flexible sheetings subject to severe bending and flexing is required.

The compositions of this invention may be rendered retroreflective by forming retroreflective elements on one side of the composition, or alternatively, by attaching a retroreflective base sheet by means of a transparent adhesive or by direct lamination. The retroreflective base sheet may comprise a member with cube corner retroreflective elements or may comprise a microsphere-based retroreflective structure, e.g., comprising a monolayer of transparent microspheres and reflective means disposed on the opposite side of the monolayer from the multi-layer composition. It is preferred that the base layer is disposed on the non-fluoropolymer layer of the multi-layer composition. An embodiment of this invention includes the encapsulated retroreflective sheeting article as is disclosed in U.S. Pat. No. 3,190,178 (McKenzie), in which the cover layer is provided by a multi-layer composition according to the present invention.

Retroreflective articles of the invention may be made in rigid or flexible form. Multi-layer compositions of the present invention may be used as barrier layers. An embodiment of the present invention includes articles in accordance with U.S. Pat. No. 5,069,964 (Tolliver) which is incorporated herein by reference, in which the plasticizer resistant barrier layer comprises a multi-layer composition in accordance with the present invention. The multi-layer compositions of the present invention may find particular utility in the construction of flexible retroreflective sheeting articles. A preferred embodiment of the present invention includes a retroreflective article in accordance with PCT Publications WO 95/11464 or WO 95/11466, both of which are incorporated herein by reference, wherein the flexible overlay film described in PCT Publication WO 95/11464 or the flexible body layer of PCT Publication WO 95/11466 is constituted by a multi-layer composition in accordance with this invention.

EXAMPLES

The following abbreviations are used throughout this section:

AT1841 is an ethylene vinylacetate copolymer available from AT Polymer, Edmonton, Canada DA is 1,12-dodecanediamine available from Aldrich Chemical Co., Milwaukee, Wis.

E250 is an ethylene vinylacetate copolymer available from E. I. DuPont de Nemours, as ELVAX™ 250

E350 is an ethylene vinylacetate copolymer available from E. I. DuPont de Nemours as ELVAX™ 350

E450 is an ethylene vinylacetate copolymer available from E. I. DuPont de Nemours as ELVAX™ 450

HDPE is high density polyethylene available from The Dow Chemical Company, Midland, Mich.

LLDPE is low linear density polyethylene available from The Dow Chemical Company MPTC is methoxy propyl tributyl phosphonium chloride available from Dyneon, LLC PA is a polyamide (nylon) polymer available from Creanova, Somerset, N.J., as VESTAMIDO™ L2101F PU is a polyurethane polymer available from Morton International, Inc. as MORTHANE™ L424.167 (MI=9.8)

PVDF is polyvinylidene fluoride available from Elf Atochem North America, Inc.

TBPB is tetrabutyl phosphonium bromide catalyst available from Aldrich Chemical Co.

TEPB is tetraethyl phosphonium bromide catalyst available from Aldrich Chemical Co.

THV200 is a terpolymer of tetrafluoroethylene, hexafluoropropylene, and vinylidene fluoride available from Dyneon LLC THV500 is a terpolymer of tetrafluoroethylene, hexafluoropropylene, and vinylidene fluoride available from Dyneon LLC Sample Preparation A mixture of a substantially non-fluorinated polymer, a di- or polyamine, and an onium catalyst was compounded in a bowl mixer equipped with roller blades at a temperature of 200° C. for about 10 minutes at 60 to 70 rpm. After mixing, the composition was removed from the mixer and molded for about 30 seconds at 200° C. into a 0.2 cm thick round sheet. A multi-layer article was made using 0.5 inch×2 inch (1.27 ×cm×5.08 cm) samples of the tie layer and 1 inch×3 inch (2.54 cm×7.62 cm) samples of the desired fluoropolymer or substantially non-fluorinated polymer outside layers.

To facilitate testing of the samples via the T-Peel tests, short pieces of silicone coated paper were placed between the tie layer and the two "outside" test layers. The release paper created "tabs" to insert into the jaws of the tensile tester. The multi-layer articles were subjected to a hot press using a heated platen press at 200° C. for about 2 minutes. The samples were cooled to room temperature by placing them in a second press that was maintained at room temperature. The compositions of the samples and the adhesion results are shown in Table 1. The units in Table 1 are lbF/in width (N/2.54 cm width).

Peel Adhesion Test Procedure

The adhesion between the layer of the composition of the invention or "tie layer" was measured according to ASTM D-1876, commonly known as the "T-Peel" test, using an INSTRON™ model 1125 tensile tester, available from Instron Corporation, Minneapolis, Minn. The test was conducted at a crosshead speed of 100 mm/minute. Each sample was placed in the tester such that the adhesion between the tie layer and one of the "outside" layers was measured. The peel adhesion strength was calculated as the average load measured during the test.

In the following Examples and Comparative Examples, various multi-layer compositions were prepared and the adhesion between the layers was evaluated. All concentrations and percentages are by weight unless otherwise indicated.

TABLE 1

| | | Adhesion to Substrate LbF/in (N/2.54 cm) | | | | |
|---|---|---|---|---|---|---|
| | Tie Layer | | | | | |
| Example | Composition | THV200 | THV500 | PDVF | LDPE | HDPE |
| 1 | AT1841/DA/TBPB 20/0.2/0.1 | 4 (17.8) | 17.8 (79.2) | 1.4 (6.2) | 16.5 (73.4) | 13.6 (60.5) |
| 2 | AT1841/DA/TBPB 20/0.2/0.2 | 5.5 (24.5) | 20.6 (91.6) | 4 (17.8) | 12 (53.4) | 16.4 (72.9) |
| 3 | AT1841/DA/MPTPC 20/0.2/0.2 | 5.7 (25.4) | 8.4 (37.4) | | 12 (53.4) | 11 (48.9) |
| 4 | AT1841/DA/TEPB 20/0.2/0.2 | 1.2 (5.3) | 11.4 (50.7) | | | |
| 5 | E350/DA/TBPB 20/0.2/0.2 | 10.5 (46.7) | 10 (44.5) | | | |
| 6 | E450/DA/TBPB 20.0.1/0.1 | 0.2 (0.9) | 8.3 (36.9) | | | |
| 7 | E450/DA/TBPB 20/0.2/0.2 | 8.6 (38.2) | 14.1 (62.7) | 1.5 (6.7) | | |
| 8 | PA/DA/TBPB 20/0.1/0.1 | >22 (97.8) | | | | |
| 9 | PU/DA/TBPB 20/0.1/0.1 | 7.5 (33.4) | 3.6 (16) | | | |
| 10 | PU/DA/TBPB 20/0.1/0.2 | 4.7 (20.9) | 2.5 (11.1) | | | |
| 11 | PU/DA/TBPB 20/0.2/0.1 | 14 (62.3) | 11.5 (51.2) | | | |
| C1 | E250 or AT1841 | 0 | 0 | | | |
| C2 | AT1841/TBPB 23.5/0.5 | 0 | 0 | | | |
| C3 | AT1841 | 0[1] | | | | |
| C4 | PU | 0 | 0 | | | |
| C5 | AT1841/DA 20/0.1 | 1 (4.4) | 2 (8.8) | <1 (<4.4) | | |
| C6 | AT1841/DA 20/0.2 | 1 (4.4) | 3 (13.3) | 1 (4.4) | 14.8 (65.8) | 17.5 (77.8) |
| C7 | E350/DA 20/0.2 | 3 (13.3) | 8.5 (37.8) | | 12 (53.4) | 9 (40.0) |
| C8 | E450/DA 20/0.1 | 0.2 (0.9) | 1.6 (7.1) | <1 (<4.4) | | |

TABLE 1-continued

| Example | Tie Layer Composition | Adhesion to Substrate LbF/in (N/2.54 cm) | | | | |
|---|---|---|---|---|---|---|
| | | THV200 | THV500 | PDVF | LDPE | HDPE |
| C9 | PA/DA 20/0.1 | 17.5 (77.8) | <1 (<4.4) | | | |
| C10 | PU/DA 20/0.1 | 1.4 (6.2) | 0.6 (2.7) | | | |
| C11 | PU/DA 20/0.2 | 12.5 (55.6) | 9.2 (40.9) | | | |

[1]The substrate was de-hydrofluorinated.

The data in Table 1 generally shows improved adhesion to fluoropolymer and polyolefin substrates with the addition of an onium catalyst while using a smaller quantity of diamine.

Examples 12–13 and Comparative Examples 12–13

The effect of the onium catalyst on the viscosity of the tie layer composition was investigated. The viscosity of the composition should be such that the composition can be co-extruded onto a fluoropolymer substrate. The samples described in Table 2 were measured for viscosity at a temperature of 193 ° C. The results are shown in Table 2. The units in Table 2 are Poise (Pa•s).

TABLE 2

| Example | Composition | Viscosity P (Pa · s) |
|---|---|---|
| 12 | PU/DA/TBPB 99/1.0/0.5 | 1100 (110) |
| 13 | PU/DA/TBPB 99/0.5/0.5 | 2600 (260) |
| C12 | PU/DA 99/1 | 1200 (120) |
| C13 | PU/DA 99.5/0.5 | 3000 (300) |

The reduction in the amount of diamine used for bonding polyurethane to fluoropolymer reduces the degradation of polyurethanes and the crosslinking of functionalized polyolefins. The addition of an onium catalyst does not affect the viscosity of the polyolefin.

What is claimed is:

1. A composition comprising a mixture of:
   a) a melt processable substantially non-fluorinated polymer wherein the substantially non-fluorinated polymer is only a polyamide, only a polyurethane, only a polyolefin, only a copolymer of polyolefins, or only a functionalized polyolefin;
   b) primary or secondary di- or polyamine; and
   c) organo-onium catalyst.

2. The composition of claim 1 wherein the polyolefin is a homopolymer or a copolymer comprising polyethylene, polypropylene, acrylic monomers, maleic anhydride, vinyl acetate, or combinations thereof.

3. The composition of claim 1 wherein the amount of said polyamine in the composition ranges from about 0.3 to about 10 parts by weight.

4. The composition of claim 1 wherein the di- or polyamine is an alkylene amine.

5. The composition of claim 1 wherein the organo-onium catalyst is a phosphonium.

6. An article comprising:
   a) a first layer comprising fluoropolymer; and
   b) a second layer bonded to the first layer comprising a mixture of:
      1) a melt processable substantially non-fluorinated polymer wherein the substantially non-fluroinated polymer is only a polyamide, only a polyurethane, only a polyolefin, only a copolymer of polyolefins, or only a functionalized polyolefin,
      2) primary or secondary di- or polyamine, and
      3) onium catalyst.

7. The article of claim 6 wherein the fluoropolymer is fluoroplastic or is a fluoroelastomer.

8. The article of claim 6 wherein the fluoropolymer comprises interpolymerized units derived from vinylidene fluoride or vinyl fluoride.

9. The article of claim 6 wherein the fluoropolymer is a homopolymer of vinylidene fluoride or vinyl fluoride or is a copolymer or terpolymer derived from vinylidene fluoride and one or more monomers selected from vinyl fluoride, tetrafluoroethylene, and hexafluoropropylene.

10. The article of claim 6 wherein the fluoropolymer comprises interpolymerized units derived from monomers comprising one or more hexafluoropropylene, tetrafluoroethylene, and chlorotrifluoroethylene monomer and one or more non-fluorinated olefinically-unsaturated monomers.

11. The article of claim 6 wherein the fluoropolymer comprises a mixture of a fluoropolymer and a polyolefin.

12. The composition of claim 1 wherein the polyolefin is a homopolymer or a copolymer comprising polyethylene, polypropylene, acrylic monomers, maleic anhydride, vinyl acetate, or combinations thereof.

13. The composition of claim 1 wherein the amount of said polyamine in the composition ranges from about 0.3 to about 10 parts by weight.

14. The article of claim 6 wherein the di- or polyamine is an alkylene amine.

15. The article of claim 6 wherein the organo-onium catalyst is a phosphonium.

16. A method of bonding fluoropolymer to substantially non-fluorinated polymer comprising the steps of:
   a) providing a bonding composition comprising a mixture of:
      1) a melt processable substantially non-fluorinated polymer wherein the substantially non-fluorinated polymer is only a polyamide, only a polyurethane, only a polyolefin, only a copolymer of polyolefins, or only a functionalized polyolefin,
      2) primary or secondary di- or polyamine, and
      3) onium catalyst;

b) providing fluoropolymer; and c) forming a multi-layer article by contacting a first layer comprising the substantially non-fluorinated polymer with a second layer comprising the fluoropolymer.

17. The method of claim 16 wherein the means of contacting the first and second layer is lamination or coextrusion.

18. The composition of claim 1 wherein the functionalized polyolefin has the functionality of carboxyl, anhydride, imide, or combinations thereof.

19. The article of claim 6 wherein the second layer further comprises a tackifier.

20. The article of claim 6 further comprising transparent microspheres.

21. The article of claim 6 wherein said article is a hose, container, film, or anti-graffiti film.

22. The composition of claim 1 further comprising a tackifier.

* * * * *